Oct. 9, 1951  F. A. MASHERIS  2,570,358
FOOD MIXER INDEXING MECHANISM
Filed April 22, 1948  2 Sheets-Sheet 1

INVENTOR
FRED A. MASHERIS.
By Watson W. Harbaugh
ATTORNEY

Oct. 9, 1951　　　　F. A. MASHERIS　　　2,570,358
FOOD MIXER INDEXING MECHANISM
Filed April 22, 1948　　　　　　　　　　2 Sheets-Sheet 2
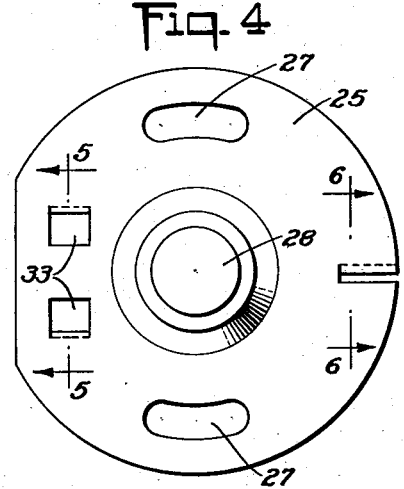
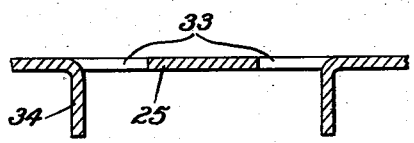
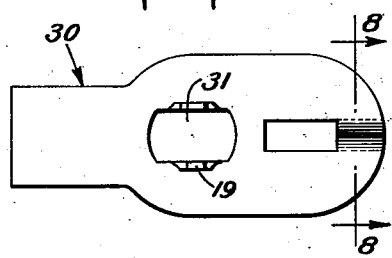
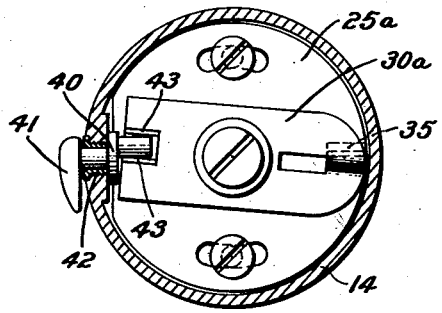
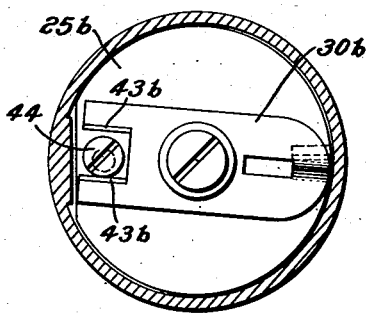
INVENTOR
FRED A. MASHERIS.

Patented Oct. 9, 1951

2,570,358

UNITED STATES PATENT OFFICE 2,570,358

FOOD MIXER INDEXING MECHANISM

Fred A. Masheris, Chicago, Ill., assignor to Dormeyer Corporation, Chicago, Ill., a corporation of Illinois Application April 22, 1948, Serial No. 28,846

12 Claims. (Cl. 259—1)

This invention relates generally to food mixers and more particularly to an improved indexing mechanism for shifting the food mixer beaters laterally between a plurality of different working positions.

Conventional food mixers for home use usually comprise an electric motor or power unit located above an elongated base where it drives one or more depending beaters disposed in a mixing bowl supported rotatably on the base by a turntable journaled in the base. A pedestal extending upwardly at one side of the bowl supports the power unit and is provided with a pivot joint which permits movement of the beaters vertically in and out of the bowl so that the bowl can be lifted on and off of the turntable.

Household food mixers having more than one beater generally have the beaters arranged in one of three ways: (1) beaters spaced longitudinally of the major axis of the base as represented by a line interconnecting the turntable and pedestal; (2) beaters spaced transversely to the major axis of the base; and (3) beaters spaced in a direction disposed at an angle of approximately 45° to the major axis of the base.

In these last two instances the rotary beaters are shifted laterally as pivoted on the pedestal to move about a vertical axis to accommodate bowls of different sizes and also to vary the point of mixing concentration during mixing operations in bowls having radii greater than the effective width of the beaters. In these instances only a small angle of movement is required to accomplish the shift desired.

In providing this shift it is preferred to locate detent means which hold the beaters at the limits of their lateral movement. However, due to the fact that the distance between detent positions is quite small where they are located in the pedestal, a little use and a little wear renders them substantially ineffective. Their "feel" is lost to the user and the "snap" action initially provided is greatly reduced.

This loss of detent or locating action is also significant in another respect because at both of its detent positions one of the beaters should be located in close proximity to the side of any sized bowl disposed on the turntable so that the reaction force of that beater is transmitted through the mixture to the wall of the bowl to cause it to rotate slowly and carry the entire mix into and through the work area of both rotating beaters as the bowl turns.

Not only is the loss of detent positioning significant in this respect for obvious reasons but when positive stops have been provided in addition to detents to locate the beaters great difficulty has been experienced in locating them correctly so that the beaters are close enough to the side of the bowl, yet do not strike the sides of the bowl at any time.

One object of this invention is to provide an indexing arrangement in the power unit supporting pedestal which freely permits the power unit to be rotated through a small angle with a snap action that is maintained constant for long periods of use.

Another object is to provide an improved indexing mechanism for use with mixers having mixing bowls of two sizes which can be readily adjustable to positively prevent the beaters from striking the side wall of the large bowl or moving beyond a predetermined point near the center of the bowl, yet bring them within the proper reaction distance.

Another object is to provide an indexing mechanism which permit the beaters to be manually moved from side to side in the bowl but which positions the beaters in either of two mixing position against inadvertent movement.

Another object is to provide a mechanism which may be readily adjusted to vary simultaneously the two beater positions while maintaining constant the relative distances between the two positions.

A further object is to provide a long wearing indexing mechanism which may be inexpensively constructed of steel stampings and installed in a mixer having die cast pedestal portions in order to provide greater strength.

A further object of this invention is to provide an indexing arrangement comprising a plate member carrying stop and detent elements supported on one part of the mixer, and a lever or crank member, cooperating with the plate, supported on the other part of said mixer which is movable with respect to the aforesaid part.

A further object is to provide a mechanism in which the overall limit stops for beater shift may be quickly adjusted during assembly of the mixers to accommodate for additive manufacturing tolerances in assembled parts.

Another object is to eliminate the need for close tolerances in parts associated with the beater shift, all discrepancies being accumulated and taken care of in a single adjustment which is made with all parts assembled, in place, and operating.

Another object is to provide a shift tolerance adjustment for the motor unit and beaters which is made at one point in a simple and easy way while the mixer is in operation.

A further object is to provide a stop mechanism in which a manually actuated lever is employed to accomplish shifting of the power unit with respect to the base.

Other objects and advantages of this invention will present themselves to those familiar with the art on reading the following specification in conjunction with the drawings and appended claims.

In the drawings:

Fig. 4 is a top view of the stop plate;

Fig. 5 is a vertical section taken on line 5—5 of Fig. 4;

Fig. 6 is a vertical section taken on line 6—6 of Fig. 4;

Fig. 7 is a top view of the lever member;

Fig. 8 is a vertical section taken on line 8—8 of Fig. 7;

Fig. 9 is a view showing a modified embodiment in which a hand lever is provided; and Fig. 10 is a view showing another embodiment.

Figure 1:
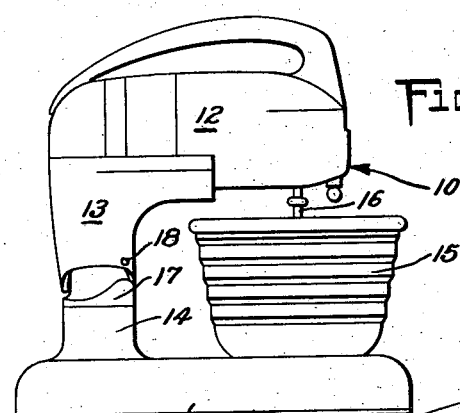
Fig. 1 is a view of a mixer provided with the indexing mechanism of this invention.

A mixer 10 provided with the indexing mechanism of this invention is shown in Fig. 1. The mixer 10 comprises a base 11, a power unit 12, and an interconnecting pedestal element 13 which supports the power unit. The base 11 is elongated in shape and is provided with a bowl supporting turntable (not shown) at one end and a pedestal like projection 14 at the other end which supports the element 13. A mixing bowl 15 is supported on the turntable and the power unit 12 overhangs the bowl 15. A pair of rotary interdigitating beaters 16 are journaled in the power unit 12 and extend downwardly into the bowl 15.

Actually the mixer 10 is provided with a pair of mixing bowls but for the purpose of illustration only the small bowl 15 has been shown. Were the large bowl to be illustrated it would be supported with its center in the same position as the bowl 15 but would extend so as to just clear the element 13.

A hinge member 17 is provided intermediate the pedestal like projection 14 and the element 13. The upper part of this member 17 extends inside of the element 13 a slight distance, and a hinge or pivot pin 18 secured at its ends in the element 13 extends through the top portion of the member 17. In the embodiment illustrated the pin 18 makes an angle of approximately 25° with respect to the plane of the base 11 and 25° with respect to the plane of the drawing. This permits the power unit 12 to rotate about the pin 18 as an axis and moving the beaters 16 in and out of the bowl 15. This arrangement as well as the other details of the mixer's construction is described in further detail in the application of William F. Bisley for Mixer, Serial No. 755,995, filed June 20, 1947, reference to which is hereby made.

Figure 2:
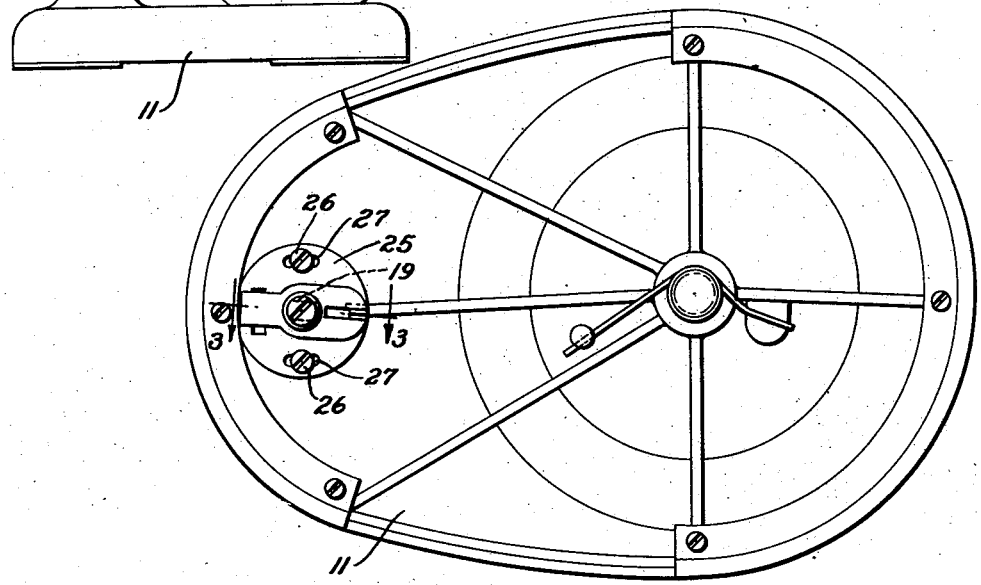
Fig. 2 is a bottom view of the mixer showing the preferred embodiment of the indexing mechanism.
Figure 3:
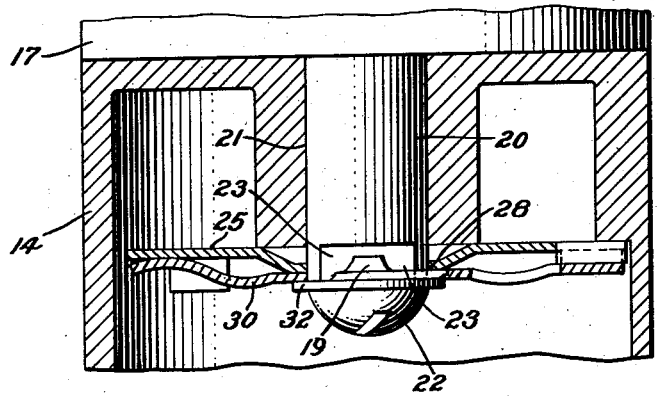
Fig. 3 is a vertical section taken on line 3—3 of Fig. 2.

To provide for relative shifting of the beaters 16 with respect to the bowl 15, necessitated when the large bowl (not shown) is to be used, the member 17 is mounted in such a manner as to be rotatable on the projection 14. To limit this rotation and to provide a locking means the indexing mechanism of this invention is employed, A projecting axle 20 is integrally formed on the member 17 and extends downwardly through a bearing 21 in the top of the projection 14. The lower end of the projecting axle 20 is tapped to receive a screw 22 and provided with two flats 23 one on either side as shown in Figs. 2 and 3. A circular stop plate 25 substantially the same size as the hollowed interior of the projection 14 is secured to the underside of the top of the projection 14 by a pair of screws 26 which extend upwardly through openings 27 in the plate 25 and into tapped holes (not shown) in the pedestal 14. The openings 27 are arcuate in shape and make it possible to rotate the plate a slight distance in either direction when the screws 26 are loosened. At the center of the plate 25 another opening 28 is provided which permits the projecting axle or shaft 20 to extend through the plate 25.

A resilient member 30 is attached to the end of the projecting axle 20 just below the plate 25 and rotates with a member 17. An opening 31 in the member 30 is provided receiving the end of the axle 20. The sides of the opening 31 are flat but with upturned integral ears 19 so that it exactly fits the end of the axle 20, the flat side portions and ears 19 lying in the flats 23 (Fig. 3). The member 30 is secured to the projection 20 by a washer 32 and the screw 22.

In the preferred embodiment the plate 25 has the shape shown in Figs. 4, 5, and 6. At one side a pair of openings 33 is cut into the plate 25 and the material from these openings is bent downwardly to form two stops 34. On the opposite side of the plate 25 another portion is bent downwardly to form a detent 35 preferably having upon its side and cut edge the same inclination as a projection 36 which cooperates therewith as hereinafter described. The forming of this plate 25 is preferably done in a single stamping operation when the plate 25 is cut from a sheet of metal.

The member 30 is formed of a resilient metal such as spring steel and has the shape shown in Figs. 3, 7, and 8. At the end corresponding to the detent 35 the metal is deformed to provide a projection 36 which cooperates with the detent 35 on assembly. The opposite end of the member 30 is bent upwardly as shown in Fig. 3 so as to lie between the stops 34 after assembly and to exert a force upon the plate 25 and hold the member 17 tightly against the top of the pedestal 14.

The member 30 is preferably cut and bent to shape by stamping and then tempered to give it the desired resiliency. When assembled as shown in Fig. 3 the member 30 is under tension each end of it exerting an upward force against the plate 25.

The operation of the indexing mechanism is as follows:

Assuming that the parts are in the position shown in Fig. 2 and the power unit 12 is set to one side of the center of the base 11 in order to mix in the large bowl (not shown), the operator exerts a manual force on the end of the power unit 12 tending to rotate it in the counterclockwise direction as viewed in Fig. 2 and tending to move the beaters 16 towards the center of the bowl. As the power unit turns, it carries with it the element 13 and the member 17 rotating the projection 20. This causes the member 30 to rotate, the projection 36 striking the detent 35 and moving away from the plate 25. Movement away from the plate 25 continues until the top of the projection 36 is directly underneath the detent 35. Further motion of the power unit 12 causes the projection to move to the opposite end of the detent 36 and the resilient force of the member 30 causes the power unit 12 to continue to move until the projection 36 has moved past the detent 35. At this point the other end of the member 30 strikes the stop 34 on plate 25 and prevents further rotation. When the power unit 12 is pushed in the opposite direction the exact reverse of this procedure occurs. The member 30 coming to rest against the other stop 34.

Thus rotation of the power unit 12 with respect to the base 11 is absolutely limited by the stops 34 and the power unit 12 is urged to the limit of travel in either direction by the coaction of the detent 35 and the projection 36.

When it is desired to adjust the relative limits of travel of the power unit 12 with respect to the base 11 the screws 26 are loosened and the plate 25 is rotated to move the stops 34 and the detent 35 to the desired new position.

Since, in any given model of mixer, the difference in bowl sizes is the same on successive mixers as they are produced, it is unnecessary to vary the relative spacing of the stops 34 with respect to each other. The only adjustment which need be made is to shift the limits of travel of the power unit 12 relative to the mixer base 11 in order to achieve proper alignment of the beaters in the two positions.

The modified embodiment shown in Fig. 9 is substantially the same as that described above except that a crank element 40 having a handle 41 attached thereto is provided instead of the pair of stops 34. The crank 40 is preferably journaled in a steel bushing 42 provided in the die cast wall of the pedestal 14. The member 30a is provided with a pair of downwardly bent projections 43. The end of the crank 40 rides between these projections. When the handle 41 is rotated the end of the crank 40 travels in a circle causing the member 30a to move from one mixing position to the other. The action of the detent elements 35 and 36 is exactly the same as that in the preferred embodiment.

In the embodiment shown in Fig. 10 a stop screw 44 is provided instead of the projecting stops 34. The member 30b is substantially the same as that of the handle operated embodiment, a pair of projections 34b being provided which act against the side stop screw 44 to limit the rotation of the power unit 12. To provide for the adjustment of these limits the screw 44 is eccentric. Rotation in one direction or the other changing the limits of movement of the member 30b. In this embodiment the plate 25b need not be provided with the adjustment holes 27 for it may be fixed permanently to the pedestal 14.

From the foregoing it will be apparent that a greatly improved household mixer indexing mechanism has been provided which may be readily adapted to most mixers where it is desired to accomplish relative shifting between the bowl and the beaters. The mechanism of this invention might for example, be employed in a mixer where the power unit was permanently attached to the base and the bowl supporting element or turntable was carried to a pivoted member connected to the base at a point remote from the center of the bowl.

Other changes and modifications such as will present themselves to those familiar with the art may be made without departing from the spirit of this invention whose scope is defined by the following claims.

What is claimed is:

1. In a mixer the combination including a base supporting a bowl, a movable element supported on said base at a point remote from said bowl, a rotary beater carried by said element and depending into said bowl, a plate attached to said base, a member attached to said element adjacent to said plate, a pair of stops on said plate for limiting rotation of said member and said element, a projection on said plate, and a double inclined projection on said member, said projections cooperating to urge said member against one or the other of said stops.

2. In a household food mixer the combination including a base, a mixing bowl supported at one end of said base, a power unit supported at the other end of said base and having a beater depending into said bowl, a projecting axle on said power unit extending into said base, a resilient lever member attached to said axle for urging said projecting axle downwardly, the end of said axle bearing against a portion of said base, stops on said base and cooperating with one end of said lever member to limit rotation thereof, a projection on said base, and a double inclined projection on said member, said projections cooperating to urge said lever member against one or the other of said stops.

3. An indexing mechanism for a food mixer comprising a plate supported on one portion of said food mixer, a pair of stops on said plate, an axle supported on another portion of said mixer movable with respect to said first mentioned portion, a resilient member attached to said axle and disposed between said stops, a projecting portion on said resilient member, and a second projecting portion on said plate having two oppositely inclined surfaces thereon, said two projecting portions cooperating to urge said resilient member into one or the other of said stops.

4. In a mixer the combination including a base supporting a bowl, a rotatable element supported on said base at a point remote from said bowl, a beater carried by said element and depending into said bowl, a plate attached to said base by a pair of screws extending through enlarged openings in said plate to said element to provide for adjustment of said plate, a member attached to said element adjacent to said plate, stop means on said plate for limiting rotation of said member and said element, a pair of oppositely inclined cam surfaces on said member and a cam follower on said plate for urging said member against one or the other of said stops.

5. An indexing mechanism comprising a rotatable element, a fixed element having an opening therein, an axle-like projection on the rotatable element extending through said opening to a point within said fixed element, a crank element rigidly supported on the end of said projection adjacent said fixed element, a slot in the end of said crank element, and an eccentric-headed screw element screwed in said fixed element the head thereof lying within said slot.

6. In a food mixer indexing mechanism the combination including a plate having a portion thereof bent downwardly at approximately a 45° angle and a rotatable resilient member having a projection thereon whose surfaces lie at angles of approximately 45° to the member and at right angles to each other, said member and said plate lying disposed adjacent to each other the resiliency of said member causing said projection to exert a force on said plate when rotated to a position over said bent portion.

7. In a household food mixer the combination including a base supporting a bowl, a pedestal element associated with said base at a point remote from said bowl, a power unit supported on said element and over-hanging said bowl, agitator means depending from said power unit into said bowl, and an indexing mechanism for said pedestal element comprising a plate fixed to said base, a resilient member fixed to said element proximate to said plate, a pair of stops on said plate cooperating with said member to limit rotation of said element so that travel of said agitator means is limited to a small arc from a point at the side of the bowl to a point at the center thereof, a projection on said plate, and a double inclined projection on said resilient member cooperating with the first mentioned projection for urging said member into one or the other of said stops.

8. In a household food mixer an indexing mechanism comprising an element having a projection thereon and a second element having a double inclined cam thereon, said elements being rotatably mounted with respect to each other and one of said elements being resilient so that said cam exerts a force on said projection, and a pair of stop means for limiting rotation of one of said elements with respect to the other, said stop means being so disposed as to check rotation as said projection reaches the ends of the cam surface.

9. In a food mixer, a power unit indexing mechanism comprising a plate member adjustably secured to the base of said food mixer, an axle supporting said power unit and extending through an opening in said plate member, a resilient member attached to said axle and rotatably movable therewith, a projection on one of said members, a second double inclined projection on the other member cooperating with the first mentioned projection for urging said member to rotate in either direction from a central position, and stops carried by said plate for limiting rotation of said axle and member to a small arc of rotation.

10. In a food mixer, the combination including a base element, a second element supporting a power unit, an axle on one of said elements extending through an opening into the other of said elements, a member attached to said axle and rotating therewith, a pair of stops on said other element for limiting rotation of said member, a projection on said member, and a second projection on said base, one of said projections having a double inclined surface and the two projections cooperating to urge said member into one or the other of said stops.

11. In a household food mixer, the combination including a base, a mixing bowl supported at one end of said base, a power unit supported at the other end of said base and having rotatable beaters depending into said bowl, a projecting axle on said power unit extending into said base, a resilient lever member attached to said axle, the ends of said lever member bearing against portions of said base to exert a downward pull on said axle, a pair of spaced parallel surfaces at one end of said lever member, and a handle actuated crank member journaled in said base, the eccentric end of said crank member being disposed between said parallel surfaces to move said lever member to either of two predetermined mixing positions as the handle is rotated.

12. In a food mixer having a power unit, an indexing mechanism for said unit comprising an element secured to the base of the food mixer, an axle supporting the power unit and extending through an opening in said element, a second element attached to said axle and rotatably movable therewith, a pair of oppositely inclined cam surfaces on one of said elements, a projection on the other of said elements cooperating with said surfaces for urging said second element in either direction from a central position, and an adjustable stop carried by said first mentioned element for limiting rotation of said axle and element to a predetermined small arc.

FRED A. MASHERIS.

REFERENCES CITED

The following references are of record in the file of this patent:

UNITED STATES PATENTS

| Number | Name | Date |
|---|---|---|
| 1,152,781 | Boal | Sept. 7, 1915 |
| 1,684,126 | Corman | Sept. 11, 1928 |
| 1,687,419 | Ainsa | Oct. 9, 1928 |
| 2,038,256 | Wright | Apr. 21, 1936 |
| 2,069,506 | Ross | Feb. 2, 1937 |